(12) United States Patent
Fan et al.

(10) Patent No.: US 11,584,181 B2
(45) Date of Patent: Feb. 21, 2023

(54) SELF LEVELING AUTONOMOUS GUIDED VEHICLE

(71) Applicant: Hong Kong R&D Centre for Logistics and Supply Chain Management Enabling Technologies Limited, Pok Fu Lam (HK)

(72) Inventors: Ka Lun Fan, Pok Fu Lam (HK); King Sau Wong, Pok Fu Lam (HK); Wing Leung Chow, Pok Fu Lam (HK); Chung Hang Leung, Pok Fu Lam (HK)

(73) Assignee: Hong Kong R&D Centre for Logistics and Supply Chain Management Enabling Technologies Limited, Pok Fu Lam (HK)

( * ) Notice: Subject to any disclaimer, the term of this patent is extended or adjusted under 35 U.S.C. 154(b) by 752 days.

(21) Appl. No.: 16/493,872

(22) PCT Filed: Mar. 15, 2017

(86) PCT No.: PCT/CN2017/076769
§ 371 (c)(1),
(2) Date: Sep. 13, 2019

(87) PCT Pub. No.: WO2018/165907
PCT Pub. Date: Sep. 20, 2018

(65) Prior Publication Data
US 2021/0114429 A1  Apr. 22, 2021

(51) Int. Cl.
*B60G 3/20* (2006.01)
*B60G 17/019* (2006.01)
(Continued)

(52) U.S. Cl.
CPC ........... *B60G 17/0152* (2013.01); *B60G 3/20* (2013.01); *B60G 7/001* (2013.01); *B60G 17/019* (2013.01);
(Continued)

(58) Field of Classification Search
CPC ............. B60G 17/0152; B60G 17/019; B60G 17/0165; B60G 3/20; B60G 7/001;
(Continued)

(56) References Cited

U.S. PATENT DOCUMENTS

| 5,048,637 | A | 9/1991 | Lomasney |
| 5,199,524 | A | 4/1993 | Ivancic |
| 7,950,478 | B2 * | 5/2011 | Terry ................... B62D 55/062 180/9.46 |

FOREIGN PATENT DOCUMENTS

| CN | 202686562 | 1/2013 |
| CN | 104527361 | 4/2015 |

(Continued)

*Primary Examiner* — Keith J Frisby
(74) *Attorney, Agent, or Firm* — Renner, Kenner, Greive, Bobak, Taylor & Weber

(57) ABSTRACT

An autonomous guided vehicle comprising a platform adapted to carry a load thereon in a working position; a plurality of suspension devices connected to the platform, each suspension device having a sensor and an actuator; and a plurality of wheels associated with the suspension devices; wherein a first wheel is associated with a first suspension device such that the sensor of the first suspension device is adapted to provide a signal when a relative position of the first wheel and the platform is altered.

19 Claims, 15 Drawing Sheets

(51) Int. Cl.
    *B60G 17/015*     (2006.01)
    *B60G 7/00*     (2006.01)
    *B66F 9/06*     (2006.01)
    *B66F 9/075*     (2006.01)
    *G05D 1/00*     (2006.01)

(52) U.S. Cl.
    CPC .......... *B66F 9/063* (2013.01); *B66F 9/07586* (2013.01); *G05D 1/0088* (2013.01); *B60G 2202/42* (2013.01); *B60G 2800/01* (2013.01)

(58) Field of Classification Search
    CPC .......... B60G 2202/42; B60G 2202/422; B60G 2202/44; B60G 2202/442; B60G 2300/38; B60G 2500/30; B60G 2600/09; B60G 2800/01; B66F 9/063; B66F 9/07586
    USPC .......................................................... 701/37
    See application file for complete search history.

(56) References Cited

FOREIGN PATENT DOCUMENTS

| | | | |
|---|---|---|---|
| CN | 104875575 A | * | 9/2015 |
| CN | 105966222 | | 9/2016 |
| JP | 2003118568 A | * | 4/2003 |
| KR | 20030016648 | | 3/2003 |

* cited by examiner

SELF LEVELING AUTONOMOUS GUIDED VEHICLE

TECHNICAL FIELD

The invention relates in general to a self-levelling autonomous guided vehicle (AGV) and, in particular, to a self-levelling AGV with an improved suspension system.

BACKGROUND

Autonomous guided vehicles (AGV) are driverless vehicles which may be used for transporting goods and materials from one location to another. Generally, AGV's are controlled by an on-board computer and follow a cable embedded in the floor. Ideally, the AGV's path is kept clear of any obstacles. Nevertheless, people, products or other materials are occasionally in the AGV's path. The AGV should therefore preferably have the capacity to sense such obstructions and come to a stop.

Frequent stopping and having the obstructions removed manually is extremely inefficient and defeats the purpose of having an automated system in the first place. Hence some advanced AGVs may be installed with pneumatic wheel. The elasticity of the inflated pneumatic wheel allows the AGV to overcome small obstacles. There was no mechanism to prevent the AGV from tipping or rolling when negotiating a larger obstacle.

In one example of an autonomous guided vehicle, the vehicle is equipped with axle and frame, the seat has a vertical shaft on the frame. There is a vertical shaft on the axle, and the vertical shaft was disposed on the vertical seat between the vertical ends of the frame mediated a spring. Through the axle and the frame, a kingpin seat fitting was resiliently connected to the frame. The vertical shaft had a ring disk, ring plate and the lift lever for raising the bar of the lifting axle. However, when raising the bar, the process requires manual work and it was very labour intensive and time consuming.

Prior art U.S. Pat. No. 5,048,637 disclosed an AGV with a bumper system. This AGV included a bumper, a pair of double-action, spring biased hinges, and a pair of switches cooperating with the hinges. The bumper was an accurate, resilient strip which extends across the entire forward portion of the vehicle and was fixed at its opposite ends to the hinges. Upon engagement with an obstruction, the bumper flexed and pivoted either of the hinges. Such movement by the hinges was sensed by the switches which, in turn, cooperate with the drive control system to stop the vehicle. However, this system could only stop the AGV but it did not assist the AGV to overcome the obstacle and continue the trip.

Prior art U.S. Pat. No. 5,199,524 disclosed an AGV having suspension systems. The suspension systems were operatively connected between the deck structure and the wheel assemblies to absorb high impact forces resulting from the loading of the deck and to restrain the transfer of the high impact forces to the wheel assemblies. More particularly, as the load, such as a container, is placed onto the deck, such as by a crane, the container is often dropped onto the deck, whereby very high impact forces are transmitted to the wheel assemblies. These forces can damage or break the wheel assemblies and, to avoid such damage or breakage, a plurality of suspension devices, such as shock absorbers and springs, or air bags, for example, are provided between the deck and wheel assemblies to absorb the impact forces. In accordance with yet another aspect of the invention, shock absorbing devices can be mounted on the deck and operated to engage the ground beneath the loaded vehicle to assist in absorbing the impact forces during loading.

The present invention is substantially different in at least one or more design elements from the prior art, and consequently, it is clear that there is a need in the art for an AGV with an improved suspension/levelling system.

Previous attempts at these types of AGV have failed to provide a suspension system that can keep the vehicle stable. In addition, previous suspension system can only deal with small obstacles and cannot provide lifting function for the AGV.

Any discussion of the prior art throughout the specification should in no way be considered as an admission that such prior art is widely known or forms part of common general knowledge in the field.

SUMMARY OF THE INVENTION

In accordance with a first aspect of the present invention to provide an autonomous guided vehicle comprising: a platform adapted to carry a load thereon in a working position; a plurality of suspension devices connected to the platform, each suspension device having a sensor and an actuator; and a plurality of wheels associated with the suspension devices; wherein a first wheel is associated with a first suspension device such that the sensor of the first suspension device is adapted to provide a signal when a relative position of the first wheel and the platform is altered.

Preferably, the autonomous guided vehicle further comprises a controller for receiving the signal from the first suspension system.

Preferably, the autonomous guided vehicle further comprises a second wheel associated with a second suspension device.

Preferably, the controller is adapted to provide a signal to the controller such that the actuator of the second suspension device adjusts a relative position between the platform and the second wheel.

Preferably, the actuator is adapted to provide a signal to the sensor when a relative position of a wheel and the platform is altered.

Preferably, the sensor is adapted to encode a signal sent from the actuator.

Preferably, the sensor is adapted to decode a signal sent from the controller.

Preferably, the actuator is a linear actuator.

Preferably, the sensor and the actuator comprise a servo-mechanism that uses error-sensing negative feedback to correct the action of the autonomous guided vehicle.

Preferably, the suspension device comprises a first arm connected to a fixed position on the platform.

Preferably, the suspension device comprises a second arm connected to the actuator, such that the actuator is adapted to change a relative position between the second arm and the platform.

Preferably, the first arm and the second arm are connected to an axle of a wheel.

Preferably, the actuator is adapted to adjust a vertical distance between a wheel and the platform.

Preferably, each of the first arm and second arm comprises lever arms joined together.

Preferably, a first lever arm of the first arm is jointed to a first lever arm of the second arm.

Preferably, the autonomous guided vehicle further comprises an angular rate sensor associated with the platform for detecting a rotational movement of the platform.

Preferably, the angular rate sensor is adapted to provide a signal to the controller for actuating an actuator of a wheel.

Preferably, the controller is adapted to receive the signal from each sensor of the plurality of suspension devices and the signal from the angular rate sensor, to thereby provide a signal to one or more actuators in order to adjust a vertical position of each wheel relative to the platform such that the working position of the platform is substantially maintained.

Preferably, the autonomous guided vehicle further comprises one or more power supplies attached to the platform.

Preferably, the platform has a rectangular shaped surface, wherein each corner of the rectangular shaped surface has a suspension device and a wheel attached thereto.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
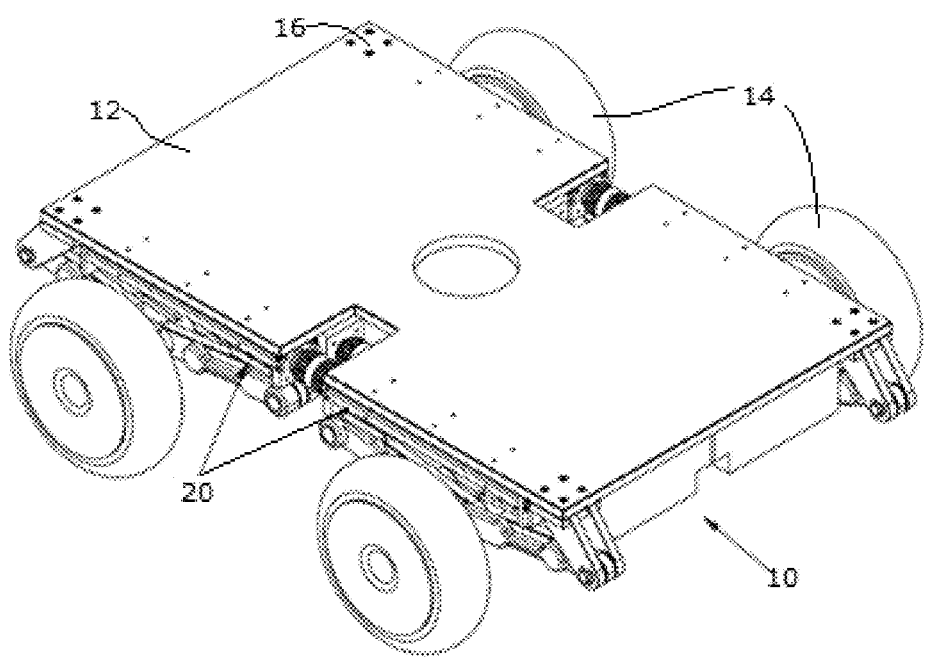
FIG. 1 is an isometric view of an autonomous guided vehicle of an embodiment of the present invention in a ground position.
Figure 2:
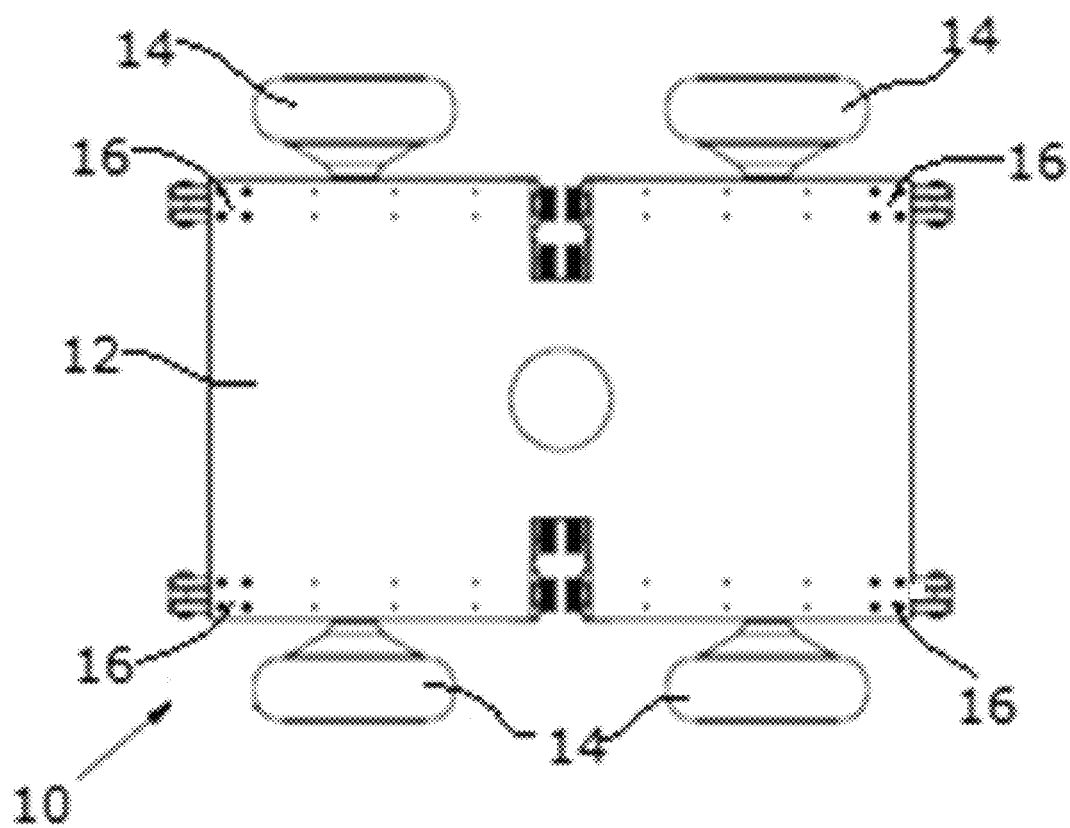
FIG. 2 is a top plan view of an autonomous guided vehicle of FIG. 1.
Figure 3:
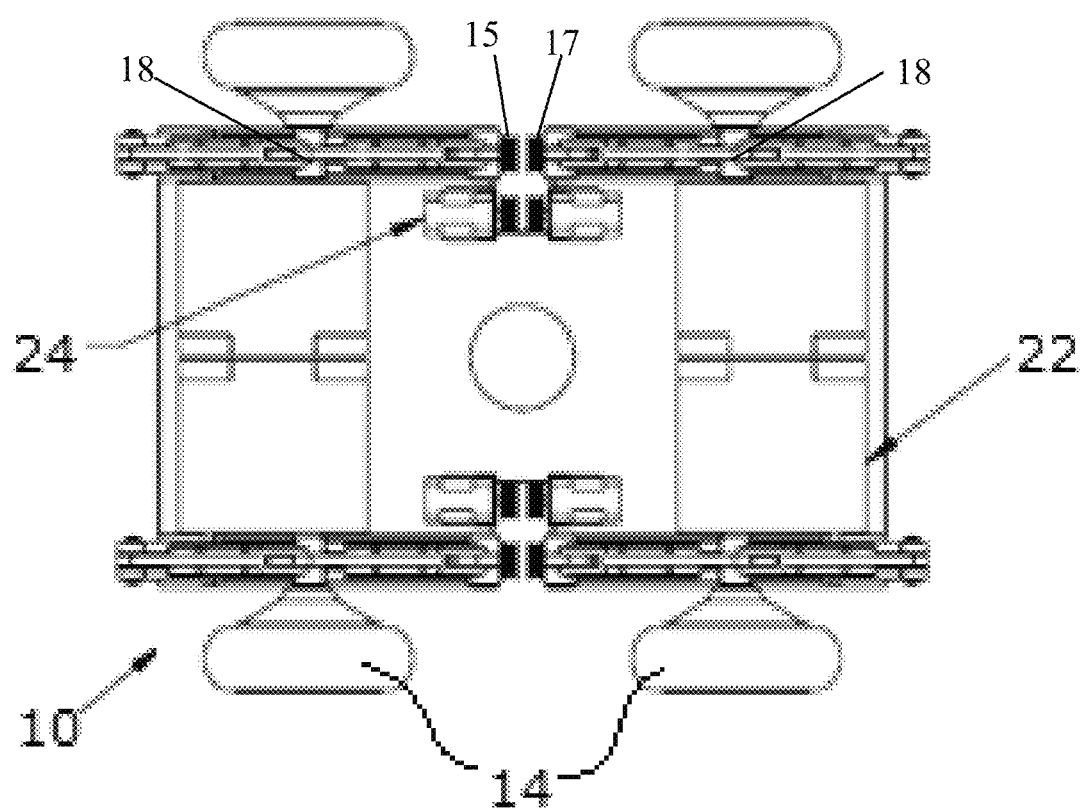
FIG. 3 is a bottom plan view of an autonomous guided vehicle of FIG. 1.
Figure 4:
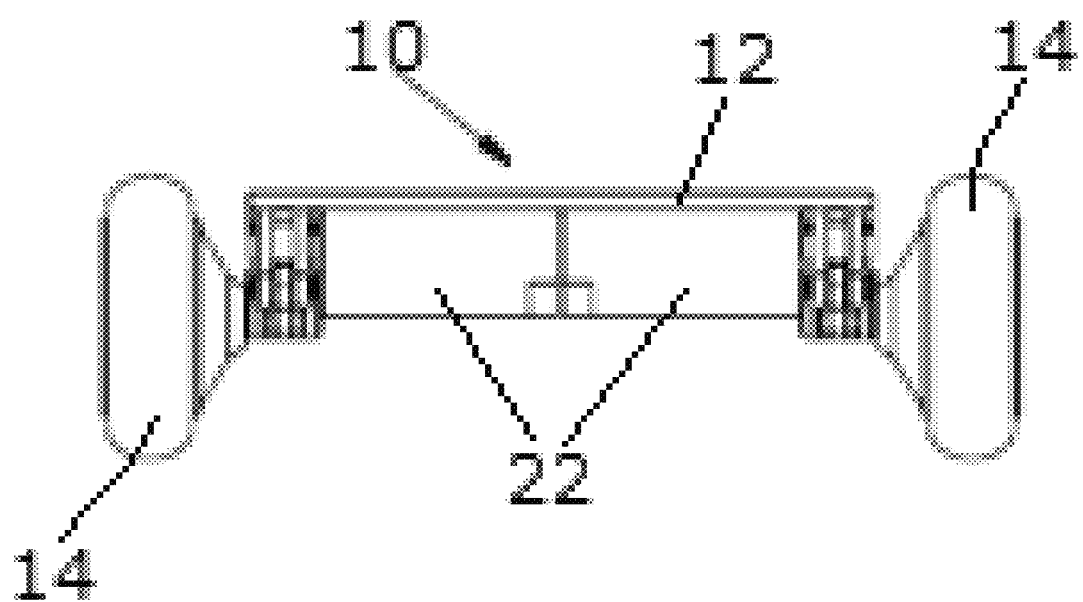
FIG. 4 is a front plan view of an autonomous guided vehicle of FIG. 1.
Figure 5:
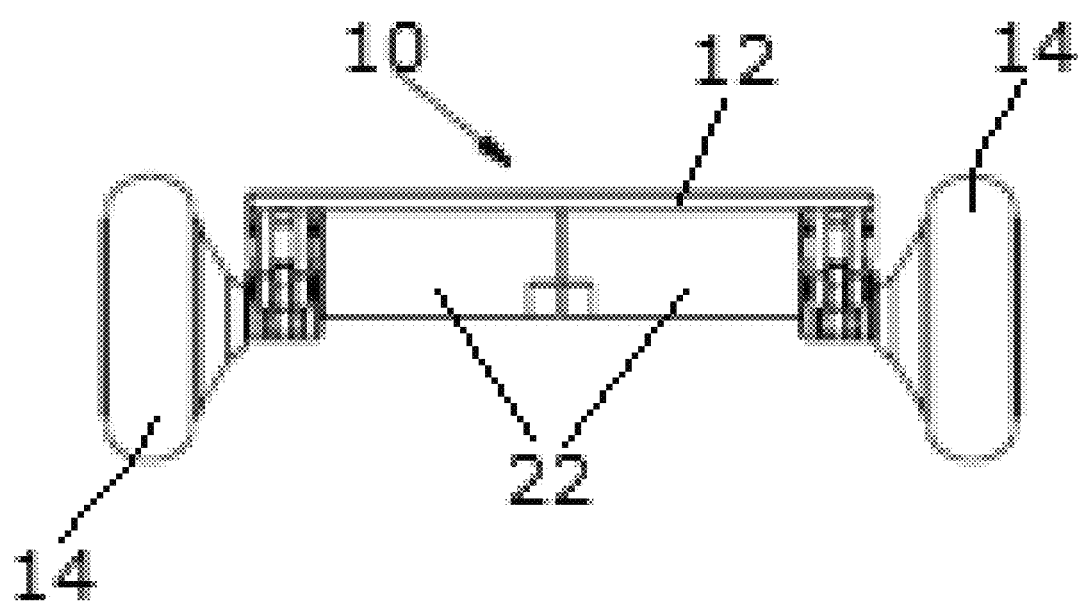
FIG. 5 is a rear plan view of an autonomous guided vehicle of FIG. 1.
Figure 6:
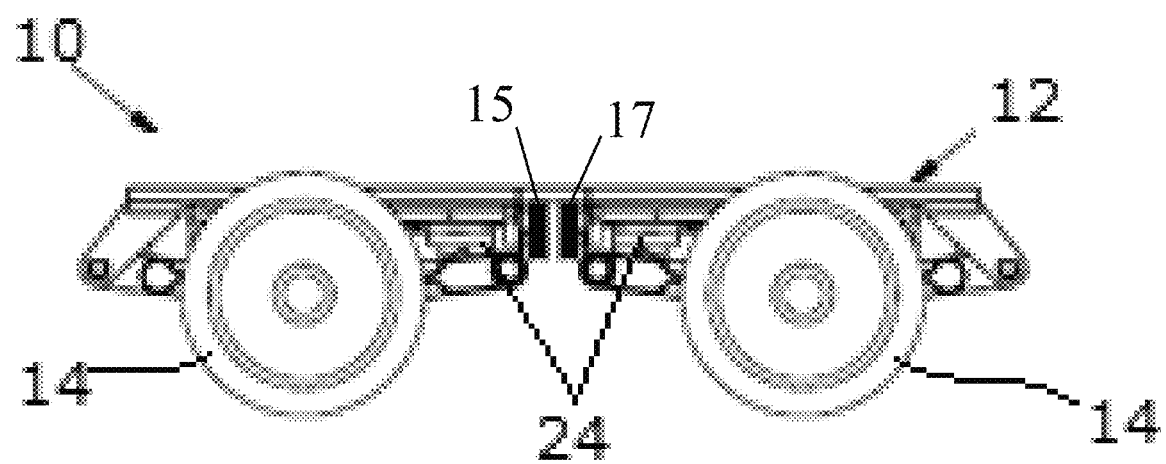
FIG. 6 is a left side plan view of an autonomous guided vehicle of FIG. 1.
Figure 7:
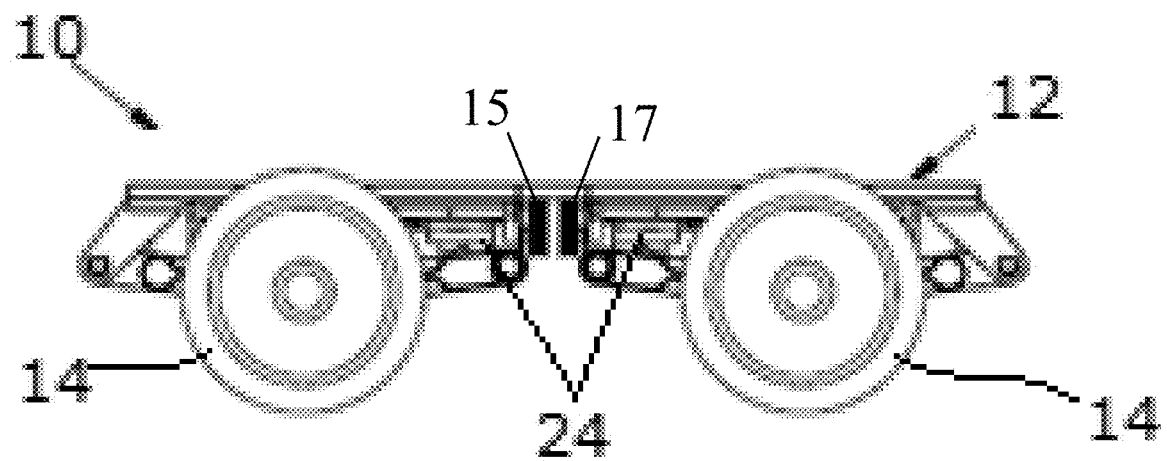
FIG. 7 is a right side plan view of an autonomous guided vehicle of FIG. 1.
Figure 8:
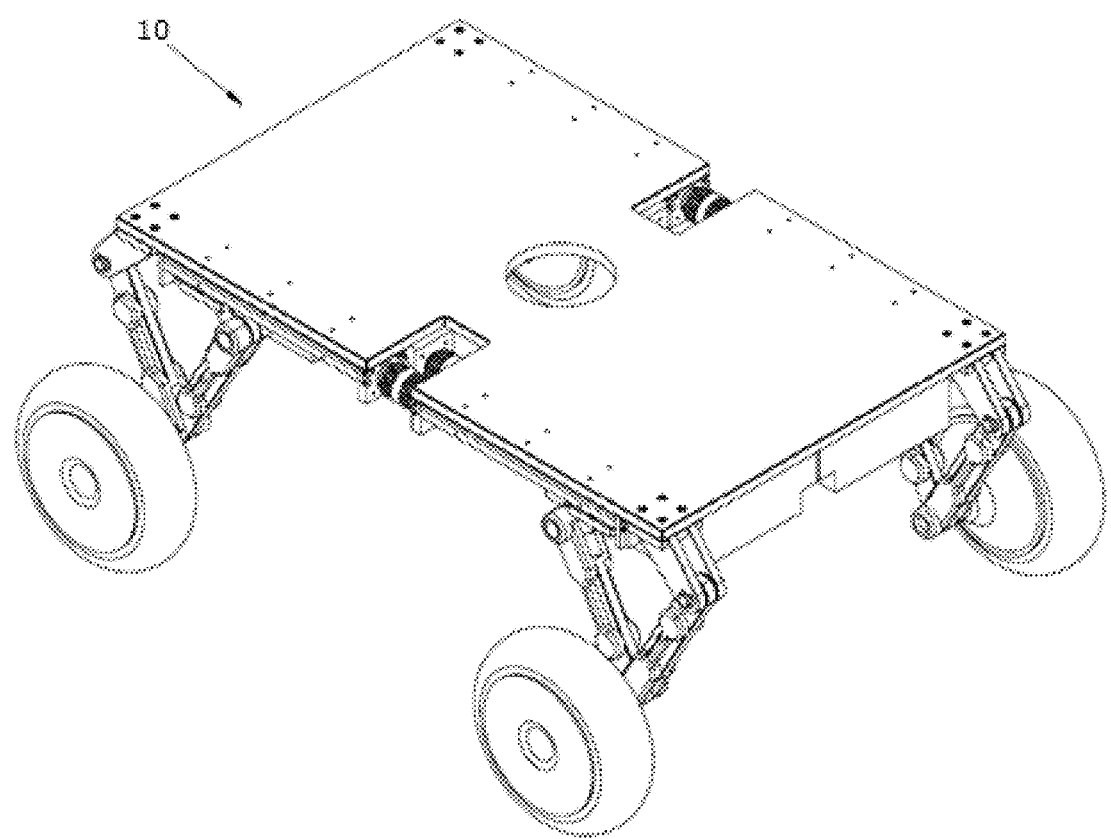
FIG. 8 is an isometric view of an autonomous guided vehicle of an embodiment of the present invention in an elevated position.
Figure 9:
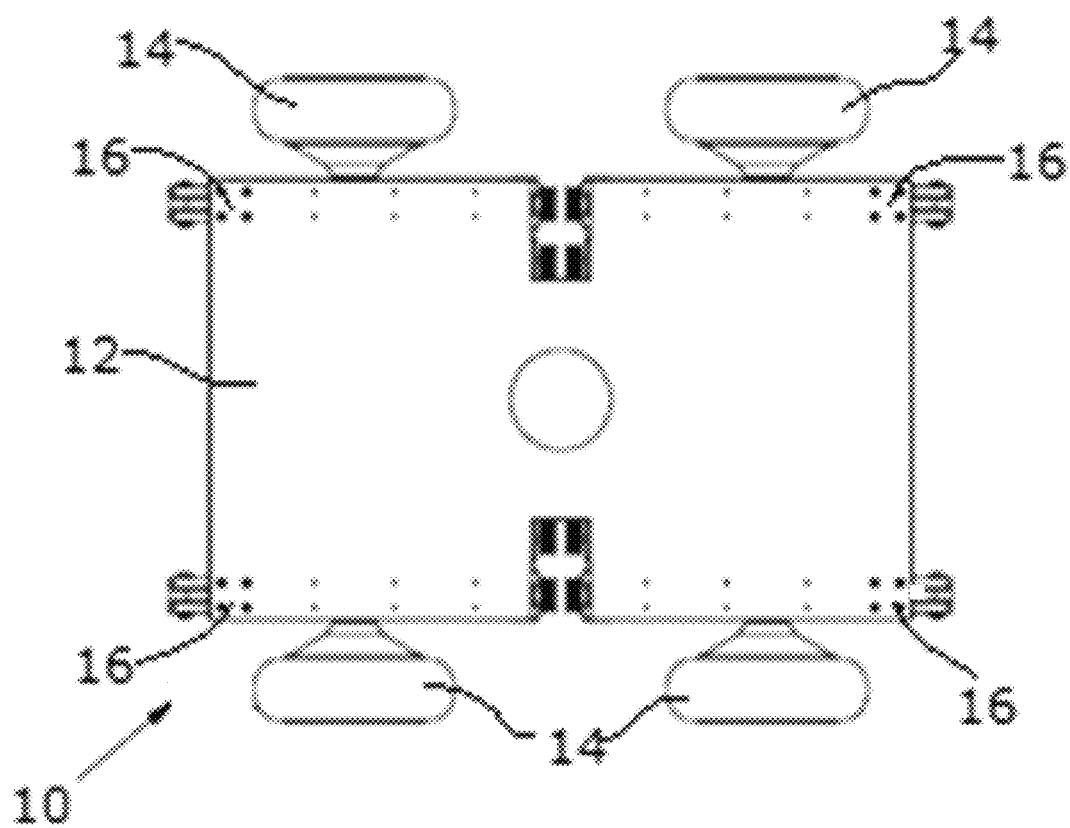
FIG. 9 is a top plan view of an autonomous guided vehicle of FIG. 8.
Figure 10:
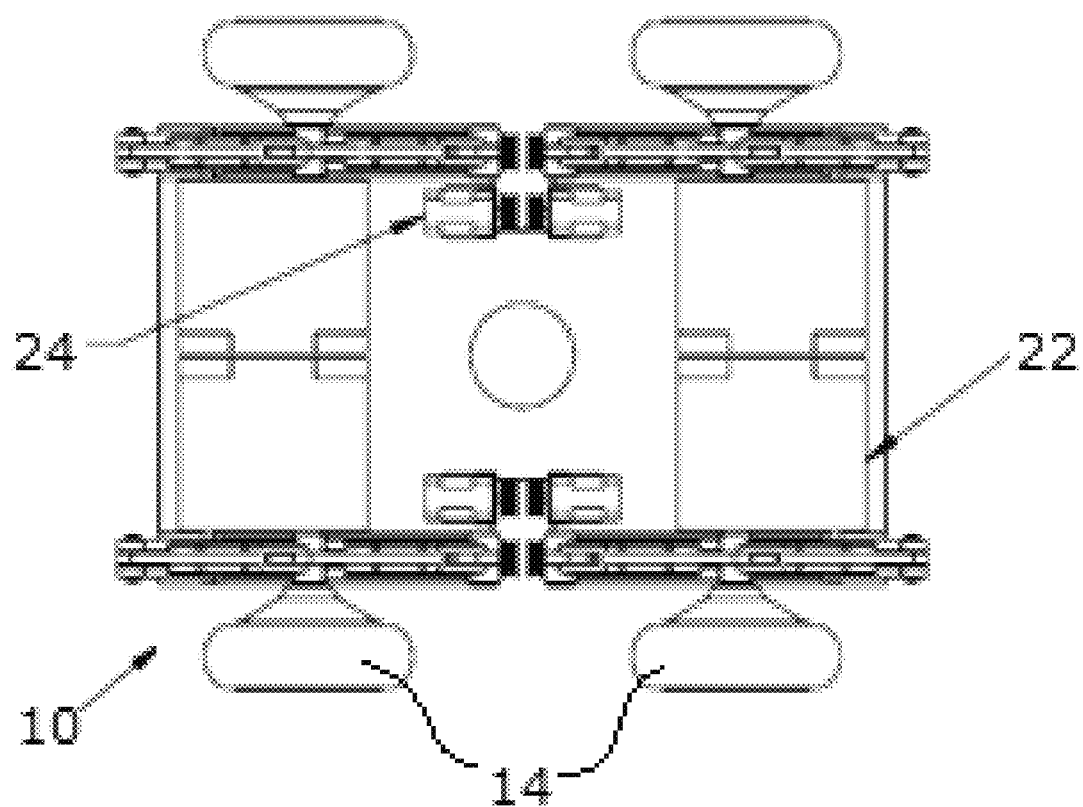
FIG. 10 is a bottom plan view of an autonomous guided vehicle of FIG. 8.

The present invention relates to an autonomous guided vehicle (AGV) 10. Referring to FIGS. 1 to 7, there is provided an autonomous guided vehicle 10 of an embodiment of the present invention comprising a platform 12 for carrying a load thereon in a working position. Typically, the AVG may be used for carrying goods around a warehouse, but in some situations, the AVG is adapted to carry passengers as well. Preferably, the working position is a level position such that the load can be stably seated on the platform. In some implementations, the platform may have a fence to prevent the load from dropping off accidentally. However, in other situations, depending on the shape of the load, the platform may be tilted.

The disadvantage of the prior art lies in the situation where the AGV is negotiating an obstacle, even with a spring loaded suspension similar to an automobile, the platform might be tilted and which causes the goods on the platform to drop. Therefore, the present invention provides an advanced suspension device that is adapted to adjust the positions of the wheels in order to maintain the working position of the platform and hence improve the stability and efficiency of the AGV.

Referring to FIGS. 1 to 7, the platform 12 of the AGV 10 has a rectangular shaped surface. Each corner 16 of the rectangular shaped surface has a suspension device 20 and a wheel 14 attached thereto. Hence, in one embodiment, the AGV 10 has a plurality of wheels 14 associated with the suspension devices 20;

In one embodiment, there are four (4) independent wheels 14 connected to four (4) suspension devices 20 at corner of the underneath surface of the platform 12. In another embodiment, there can be two (2) independent wheels 14 connected to two (2) suspension devices 20 along the same vertical plane under the platform 12. In yet another embodiment, there can be four (4) independent wheels 14, and each pair is connected to one (1) suspension device 20.

Figure 15:
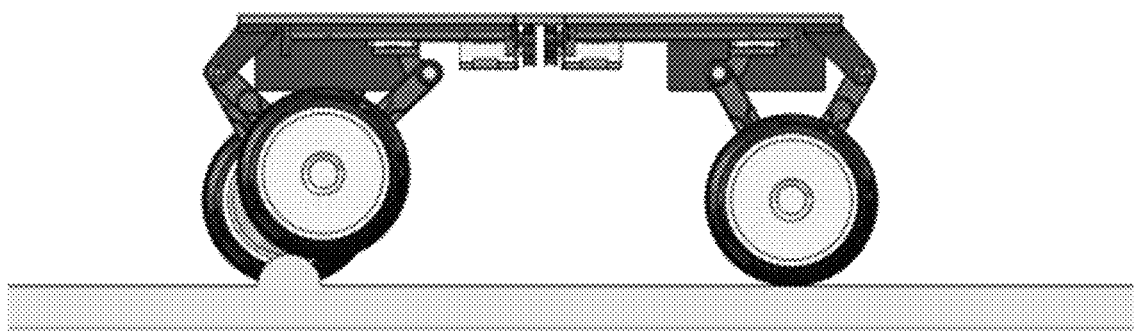
FIG. 15 is a side plan view of an autonomous guided vehicle of FIG. 1 negotiating an obstacle.

Each suspension device 20 has a sensor 24 and an actuator, wherein a wheel is associated with a suspension device such that the sensor of the first suspension device is adapted to provide a signal when a relative position of the first wheel and the platform is altered. This occurs when the AGV 10 runs into a small obstacle as shown in FIG. 15. When one of the front wheels 14 tries to negotiate an obstacle, it alters a vertical position between a wheel 14 and the platform 12. As the wheel 14 is associated with an actuator of a suspension device 20, the actuator records the extents of change and generates a signal to send to the sensor 24.

In one embodiment, the sensor 24 and the actuator 15 comprise a servomechanism 17 that uses error-sensing negative feedback to correct the action of the autonomous vehicle. Hence, the sensor 24 is adapted to encode a signal sent from the actuator. And the sensor is adapted to decode a signal sent from a controller 11.

In one embodiment, the controller 11 is a microcontroller, such as Audrino, or CM700. In another embodiment, the controller further comprises a remote control function to allow a user to control the system remotely. In one preferred embodiment, each of the servos is directly connected to the controller 11. In another embodiment, the servos are chained together such that some servos do not directly attach to the controller 11.

As shown in FIG. 1 to FIG. 7 representing an embodiment of the present invention the actuator 15 is in the form of a linear actuator. In particular, in this example, the actuator is a mechanical linear actuator with a rotary motion motor attached thereto.

In the embodiment shown in FIGS. 1 to 7, the linear actuator uses a screw mechanism for motion conversion. The screw mechanism operates by rotating the actuator's nut, the screw shaft moves in a line. There are other types of linear actuator, such as wheel and axle, which comprise a hoist, winch, rack and pinion, chain drive, belt drive, rigid chain and rigid belt actuators operate on the principle of the wheel and axle. A rotating wheel moves a cable, rack, chain or belt to produce linear motion. Further, there is a cam mechanism which functions on a principle similar to that of the wedge, but provides relatively limited travel. As a wheel-like cam rotates, its eccentric shape provides thrust at the base of a shaft.

Referring to FIG. 15, when the front wheel negotiates an obstacle, a signal is given to the controller 11 to record the change in vertical position of a front wheel. The controller 11 can in real-time calculate the vertical displacement required for the second wheel 14. The controller 11 then sends a signal to the actuator 15 such that the actuator 15 of the back suspension device adjusts a relative position between the platform and the back wheel.

In one example embodiment, the autonomous guided vehicle includes a suspension device that comprises a first arm connected to a fixed position on the platform and a second arm connected to the actuator 15, such that the actuator 15 is adapted to change a relative position between the second arm and the platform.

Referring to FIGS. 1 to 14, each suspension device 20 comprises a first arm having a first top lever arm 26 and first bottom lever arm 30, and a second arm having a second top lever arm 28 and a second bottom lever arm 32.

One of the first top lever arm 26 and second top lever arm 28 has a proximal end attached to a fixed point under the platform 12 such that this top lever arm may pivot around the fix point but is restrained from traversing along the platform 12. The proximal end of the other top lever arm is connected to the actuator 15 such as that the actuator can move the other top lever arm along the platform.

Figure 11:
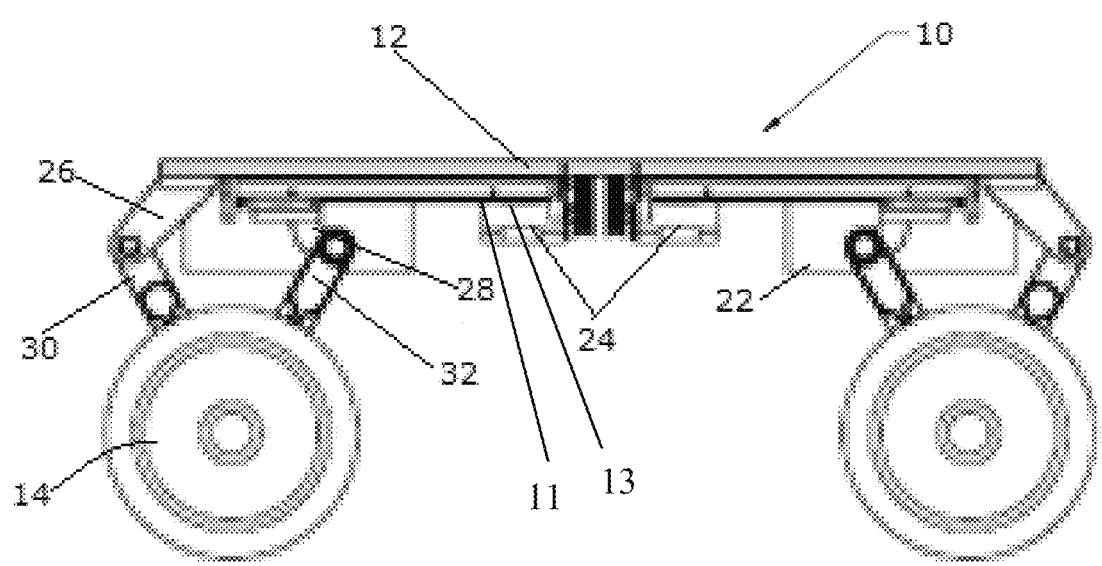
FIG. 11 is a left side view of an autonomous guided vehicle of FIG. 8.
Figure 12:
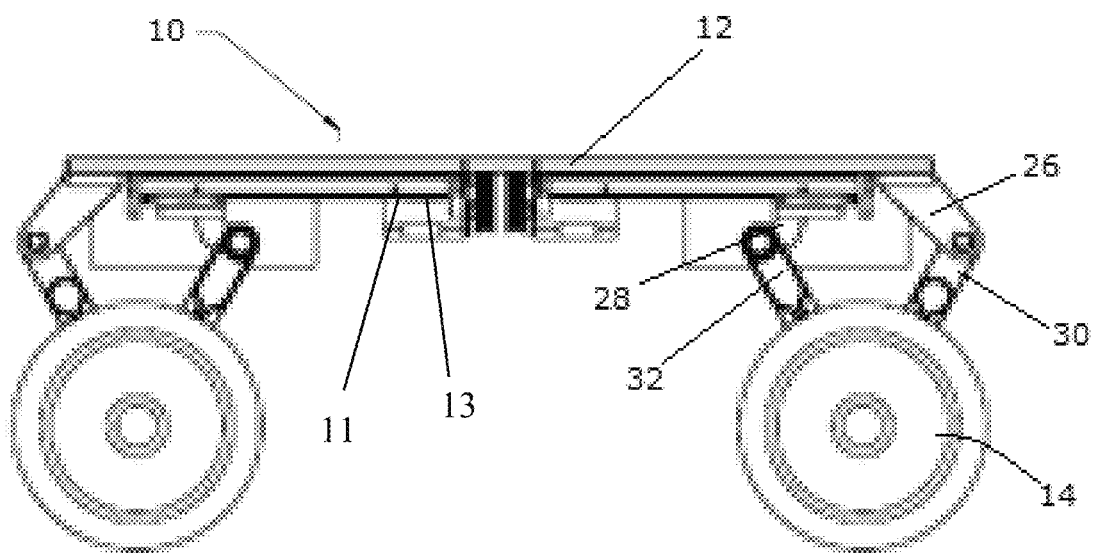
FIG. 12 is a right side view of an autonomous guided vehicle of FIG. 8.
Figure 13:
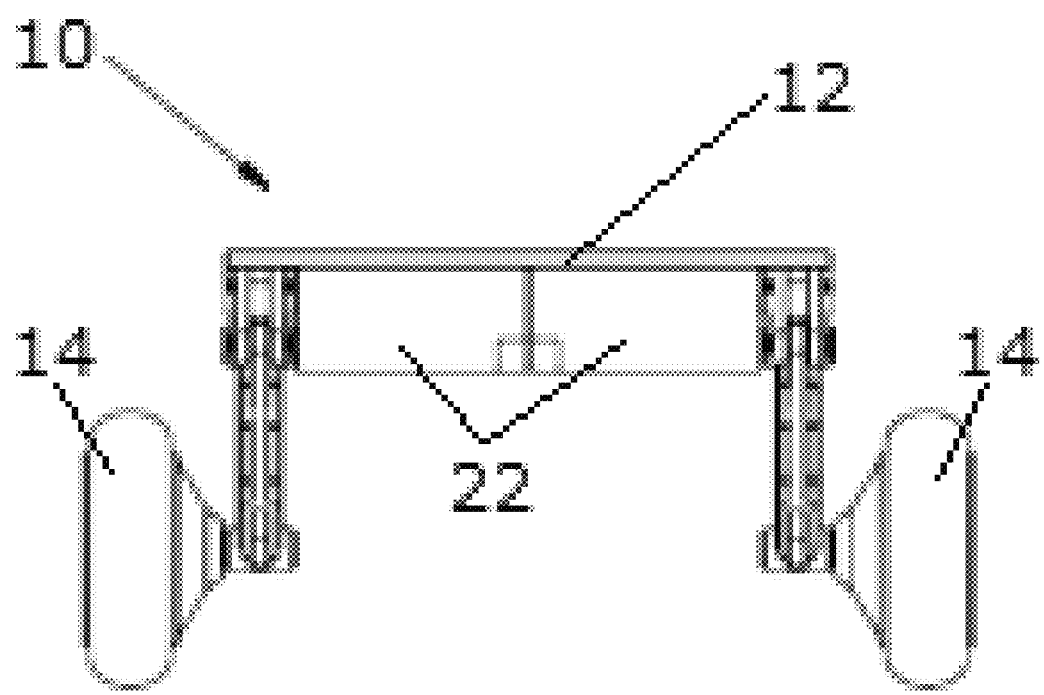
FIG. 13 is a front plan view of an autonomous guided vehicle of FIG. 8.
Figure 14:
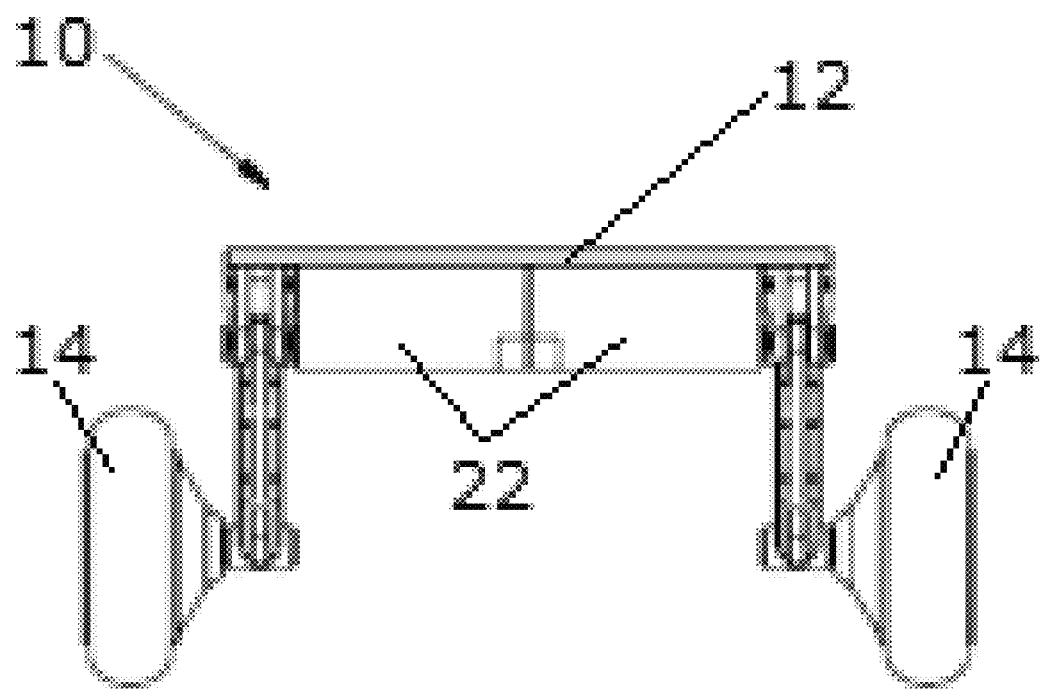
FIG. 14 is a rear plan view of an autonomous guided vehicle of FIG. 8.

In one preferred embodiment as shown in FIG. 11, a distal end of a top lever arm 26 is connected to a proximal end of a bottom lever arm 30, and a distal end of a top lever arm 28 is connected to a proximal end of a bottom lever arm 32.

In a preferred embodiment, the distal end of the first bottom lever arm 30 is connected to a distal end of the second bottom lever arm 32 at a joint. This joint is coincided with the centre of the wheel 14 such as they are connected by an axle 18 of the wheel.

When the actuator 15 moves the top lever arm 28 along the platform, it adjusts the relative horizontal distance between the proximal end of the top lever arm 26 and the proximal end of the top lever arm 28. To compensate the increase in the relative horizontal distance, the vertical distance between the wheel 14 and the platform will decrease. On the other hand, to increase the vertical distance between the wheel 14 and the platform, the actuator has to move the proximal end of top lever arm 28 closer to the proximal end of the top lever arm 26. Thereby, a traverse displacement of the actuator 15 is converted to a horizontal displacement between the wheels 14 and the platform 12.

In one embodiment as shown in FIG. 1 to FIG. 15, the top lever arms 26 and 28 do not directly connect to each other. In another embodiment, the top lever arm 26 is joined to the top lever arm 28, and similarly the bottom lever arm 30 is joined to the bottom lever arm 32 in order to form a scissor configuration.

In another embodiment, the autonomous guided vehicle 10 further comprises an angular rate sensor 13, such as an electronic gyroscope, associated with the platform for detecting a rotational movement of the platform.

In one embodiment, the autonomous guided vehicle has an angular rate sensor 13 adapted to provide a signal to the controller 11 for actuating an actuator of a wheel.

The controller 11 is adapted to receive the signal from each sensor of the plurality of suspension devices and the signal from the angular rate sensor 13, to thereby provide a signal to one or more actuators 15 in order to adjust a vertical position of each wheel relative to the platform such that the working position of the platform is substantially maintained.

In one embodiment of the present invention, the AGV includes 4 independent suspension devices providing a mechanism for each wheel to move up and down. When one of the wheels travels on an uneven surface, the mechanism will be moving up the wheel independently as shown in FIG. 15. A gyroscope implemented levelling detection and feed the signal to the controller 11. The controller 11 will drive the actuator 15 instantly to maintain the working position of the platform 12. Therefore, the suspension devices may maintain the platform 12 of the AGV horizontally.

Preferably, the suspension devices can be used as a lifting system for the AGV as shown in FIGS. 11 to 14, in which the platform 12 is lifted up. The four (4) wheels 14 and the suspension devices synchronically maintain the elevated position of the platform.

In one embodiment of the present invention, the AGV comprises one or more power supplies 22 attached to the platform. In one embodiment, each power supply 22 is implemented as a rechargeable battery such as a lithium ion battery.

Although, the present invention is related to the technical field of autonomous guided vehicles, it is envisaged that the application can cover other types of automated vehicles or conveying systems.

It will also be appreciated that where the methods and systems of the present invention are either wholly implemented by computing systems or partly implemented by computing systems then any appropriate computing system architecture may be utilised. This will include standalone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An autonomous guided vehicle comprising:
    a platform adapted to carry a load thereon in a working position;
    a plurality of suspension devices connected to the platform, each suspension device having a sensor and an actuator; and
    a plurality of wheels associated with the suspension devices;
    wherein a first wheel is associated with a first suspension device such that the sensor of the first suspension device is adapted to provide a signal when a relative position of the first wheel and the platform is altered,
    wherein the actuator is adapted to provide a signal to the sensor when a relative position of a wheel and the platform is altered.

2. An autonomous guided vehicle according to claim 1, further comprising a controller for receiving the signal from the first suspension device.

3. An autonomous guided vehicle according to claim 2, further comprising an angular rate sensor associated with the platform for detecting a rotational movement of the platform.

4. An autonomous guided vehicle according to claim 3, wherein the angular rate sensor is adapted to provide a signal to the controller for actuating an actuator of a suspension device.

5. An autonomous guided vehicle according to claim 4, wherein the controller is adapted to receive the signal from each sensor of the plurality of suspension devices and the signal from the angular rate sensor, to thereby provide a signal to one or more actuators in order to adjust a vertical position of each wheel relative to the platform such that the working position of the platform is substantially maintained.

6. An autonomous guided vehicle according to claim 1, further comprising a second wheel associated with a second suspension device.

7. An autonomous guided vehicle according to claim 6, wherein the controller is adapted to provide a signal to an actuator of the second suspension device, such that the actuator of the second suspension device adjusts a relative position between the platform and the second wheel.

8. An autonomous guided vehicle according to claim 1, wherein the sensor is adapted to encode a signal sent from the actuator.

9. An autonomous guided vehicle according to claim 1, wherein the sensor is adapted to decode a signal sent from the controller.

10. An autonomous guided vehicle according to claim 1, wherein the actuator is a linear actuator.

11. An autonomous guided vehicle according to claim 1, further comprising one or more power supplies attached to the platform.

12. An autonomous guided vehicle according to claim 1, wherein the platform has a rectangular shaped surface, wherein each corner of the rectangular shaped surface has a suspension device and a wheel attached thereto.

13. An autonomous guided vehicle, comprising:
a platform adapted to carry a load thereon in a working position;
a plurality of suspension devices connected to the platform, each suspension device having a sensor and an actuator; and
a plurality of wheels associated with the suspension devices;
wherein a first wheel is associated with a first suspension device such that the sensor of the first suspension device is adapted to provide a signal when a relative position of the first wheel and the platform is altered, and
wherein the actuator comprises a servomechanism that uses error-sensing negative feedback to correct the action of the autonomous guided vehicle.

14. An autonomous guided vehicle, comprising:
a platform adapted to carry a load thereon in a working position;
a plurality of suspension devices connected to the platform, each suspension device having a sensor and an actuator; and
a plurality of wheels associated with the suspension devices;
wherein a first wheel is associated with a first suspension device such that the sensor of the first suspension device is adapted to provide a signal when a relative position of the first wheel and the platform is altered, and
wherein the first suspension device comprises a first arm connected to a fixed position on the platform.

15. An autonomous guided vehicle according to claim 14, wherein the first suspension device comprises a second arm connected to the actuator, such that the actuator is adapted to change a relative position between the second arm and the platform.

16. An autonomous guided vehicle according to claim 15, wherein the first arm and the second arm are connected to an axle of a wheel.

17. An autonomous guided vehicle according to claim 16, wherein the actuator is adapted to adjust a vertical distance between a wheel and the platform.

18. An autonomous guided vehicle according to claim 15, wherein each of the first arm and second arm comprises lever arms joined together.

19. An autonomous guided vehicle according to claim 18, wherein a first lever arm of the first arm is jointed to a first lever arm of the second arm.

\* \* \* \* \*